United States Patent [19]
Cho

[11] Patent Number: 5,864,461
[45] Date of Patent: Jan. 26, 1999

[54] COMPACT FLUORESCENT LAMP ADAPTER

[76] Inventor: Sung Ho Cho, 100-4 Onsu-dong, Kuro-gu, Seoul, Rep. of Korea

[21] Appl. No.: 751,781

[22] Filed: Nov. 18, 1996

[30]    Foreign Application Priority Data

Jun. 15, 1996 [KR] Rep. of Korea .................. 96-16018

[51] Int. Cl.$^6$ ..................................... H01J 7/44
[52] U.S. Cl. .................... 361/674; 315/58; 174/DIG. 2
[58] Field of Search .................... 315/56, 58; 313/318.1, 313/318.04; 362/226, 260; 439/56, 226, 236, 336, 602, 646; 174/DIG. 2; 361/736, 752, 622, 623, 641, 674, 823, 824, 836

[56]                References Cited

U.S. PATENT DOCUMENTS

| 5,015,917 | 5/1991 | Nigg . |
| 5,189,339 | 2/1993 | Peshak . |
| 5,320,548 | 6/1994 | Schadhauser . |
| 5,336,116 | 8/1994 | Boteler . |
| 5,545,950 | 8/1996 | Cho . |
| 5,569,981 | 10/1996 | Cho . |
| 5,691,598 | 11/1998 | Belle . |

Primary Examiner—Gerald Tolin
Attorney, Agent, or Firm—Michaelson & Wallace; Peter L. Michaelson; John C. Pokotylo

[57]                ABSTRACT

A compact fluorescent lamp adapter for compact fluorescent lamp includes a ballast case which has a lower plate having a compact fluorescent lamp socket and an upper plate having an incandescent lamp base, the upper plate being coupled to the lower plate. The compact fluorescent lamp socket formed in the lower plate has a plug retaining portion for receiving a compact fluorescent lamp plug, a PCB having a plug through hole for accommodating a plug retaining portion of the compact fluorescent lamp socket, and having a fluorescent lamp ballast circuit. The compact fluorescent lamp socket comprises at least two terminals having ring contact portion to be contacted fluorescent lamp plug pin and elastic contact portion to be contacted with contact pad formed on the PCB, and a terminal settling plate for settling said terminals onto pin through holes respectively formed in said lower plate. An elastic hooking jaws are formed to both side walls of the plug retaining portion for locking said terminal settling plate when said terminal settling plate moves downward a prescribed distance from the upper end of said plug retaining portion.

5 Claims, 6 Drawing Sheets

COMPACT FLUORESCENT LAMP ADAPTER

FIELD OF THE INVENTION

The present invention relates to a compact fluorescent lamp adapter having a ballast apparatus, which has a socket for the compact fluorescent lamp and a commercial incandescent bulb bases.

BACKGROUND OF THE INVENTION

An attempt for decreasing the size of fluorescent lamp and a lamp apparatus has been conducted for a long time. The effort was successful in that making a ballast of fluorescent lamp adaptable to a commercial incandescent lamp socket and reducing the sizes of a lamp and a ballast.

One example of the small-sized fluorescent lamp, a compact fluorescent lamp is shown in FIG. 1. A socket-type ballast device which is equipped with a socket for compact fluorescent lamp is shown in FIG. 2.

The socket-type ballast device has a socket 18 for compact fluorescent lamp 27, and a commercial incandescent lamp base 19.

The base 19 is adapted to an incandescent lamp socket, and the compact lamp socket receives a plug 28 and pins 29 of the compact fluorescent lamp 27. When the plug is inserted into the socket 18, a projection 28-1 of socket plug 28 of the compact fluorescent lamp is locked by a locking spring not shown in FIG. 2.

A compact fluorescent lamp socket and a ballast device which are invented by the present inventor were filed in the USPTO, a Ser. No. are 08/251,580, now U.S. Pat. No. 5,545,950, filed on May 31, 1994 and 08/446,895 filed May 17, 1995, now U.S. Pat. No. 5,569,981.

These two invention were for reducing the size of a ballast device.

However, the above-described prior designs of this applicant has a sufficiently reduced size, but a manufacturing process is difficult for mass production. That is, the assembling process needs much time that terminal settling plate is assembled to socket substrate by means of screws, tails of terminals are soldered to PCB or to the lead of the transformer or other elements, and two lines from incandescent lamp base are connected to the rectifying circuit of PCB.

SUMMARY OF THE INVENTION

Therefore it is an object of the present invention to provide a compact fluorescent lamp adapter for use with a compact fluorescent lamp socket and a commercial incandescent lamp base. The adapter has a structure that may improve assembling efficiency by without requiring soldering and driver processing, while the size is significantly reduced.

According to the present invention, an adapter for compact fluorescent lamp includes a ballast case which has a lower plate having a compact fluorescent lamp socket and an upper plate having an incandescent lamp base, the upper plate being coupled to the lower plate, the compact fluorescent lamp socket formed in the lower plate having a plug retaining portion for receiving a compact fluorescent lamp plug, a PCB having a hole for receiving a plug retaining portion of the compact fluorescent lamp socket and having a fluorescent lamp ballast circuit. The compact fluorescent lamp socket has at least two terminals having ring contact portion to be contacted with fluorescent lamp plug pin and elastic contact portion to be contacted with contact pad formed on the PCB, and a terminal settling plate for settling said terminals onto through holes respectively formed in said lower plate. An elastic hooking jaws are formed to both side walls of the plug retaining portion for locking said terminal settling plate when said terminal settling plate moves downward beyond a prescribed distance from the upper end of said plug retaining portion. A plurality of projections are formed at an inner side of said upper plate for pressing contact pads formed on said PCB to the elastic contact portions of the terminals when said upper plate is coupled with said lower plate.

According to the present invention, the socket for compact fluorescent lamp comprises a socket substrate having through holes for fluorescent lamp plug pins to be inserted and having a plug retaining portion for receiving a compact fluorescent lamp plug; at least two terminals having a ring contact portion for contacting with the fluorescent lamp plug pins and an elastic contact portion for contacting with contact pads formed on a PCB; a terminal settling plate having terminal retain grooves for settling the terminals onto a through hole formed in said socket substrate; and the plug retaining portion having a elastic hooking jaws at both sides of the plug retaining portion for locking the terminal settling plate to a predetermined position.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figures 3A, 3B:
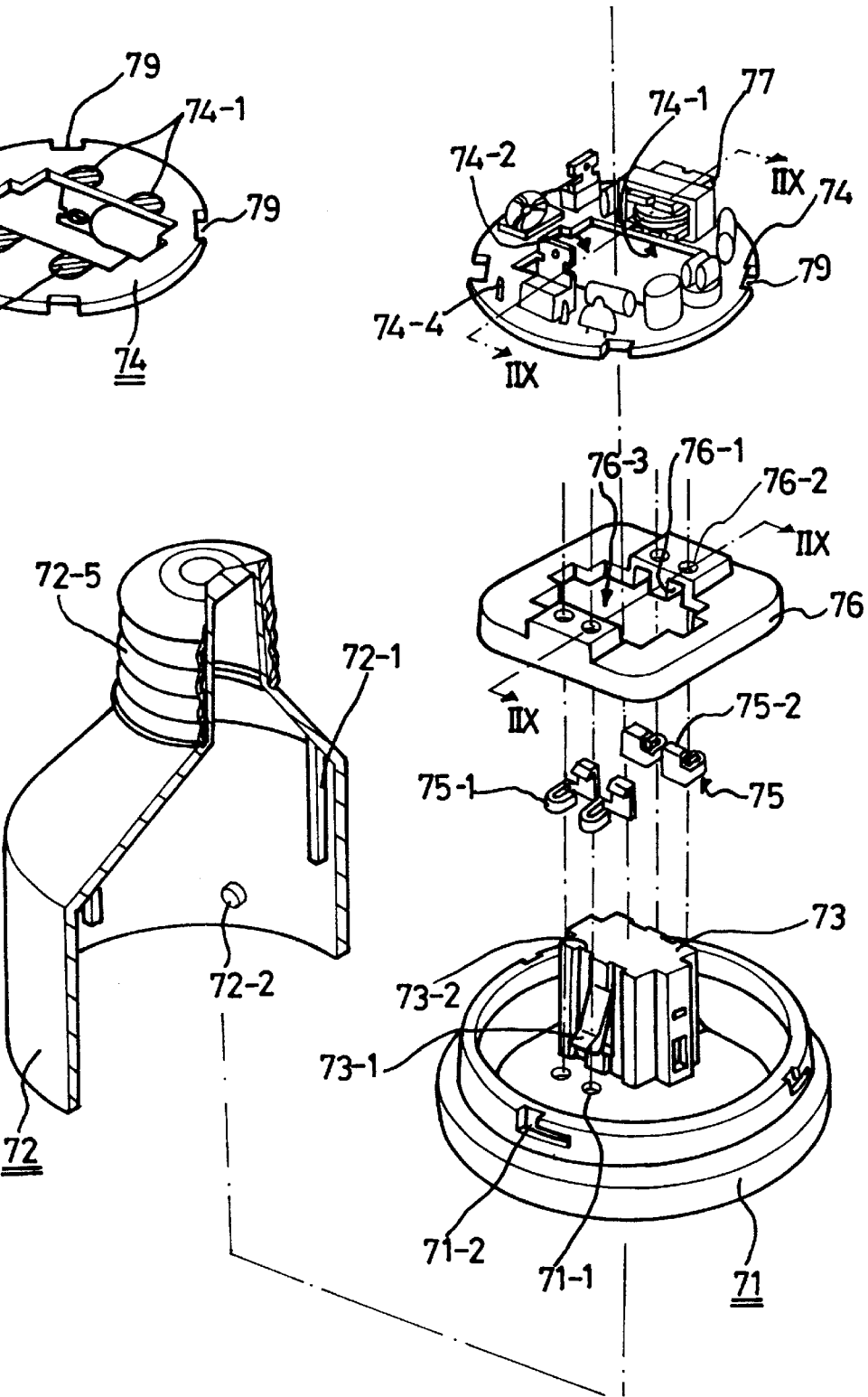
FIG. 3 and 5 is an exploded perspective view showing structures of a compact fluorescent lamp adapter according to the present invention.
Figure 4:
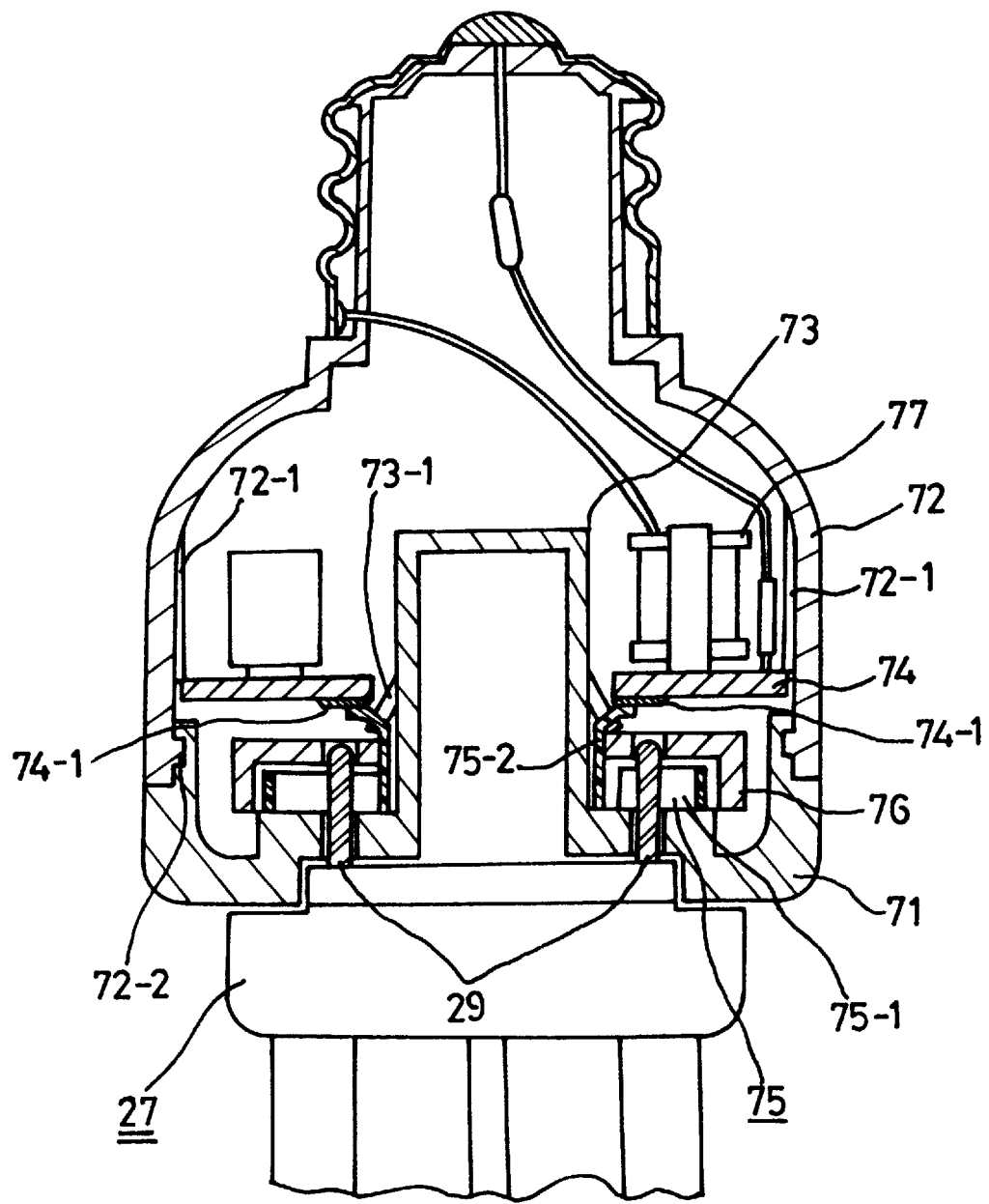
FIG. 4 is a sectional view showing a part of the assembled adapter for compact fluorescent lamp according to the present invention.
Figure 5A:
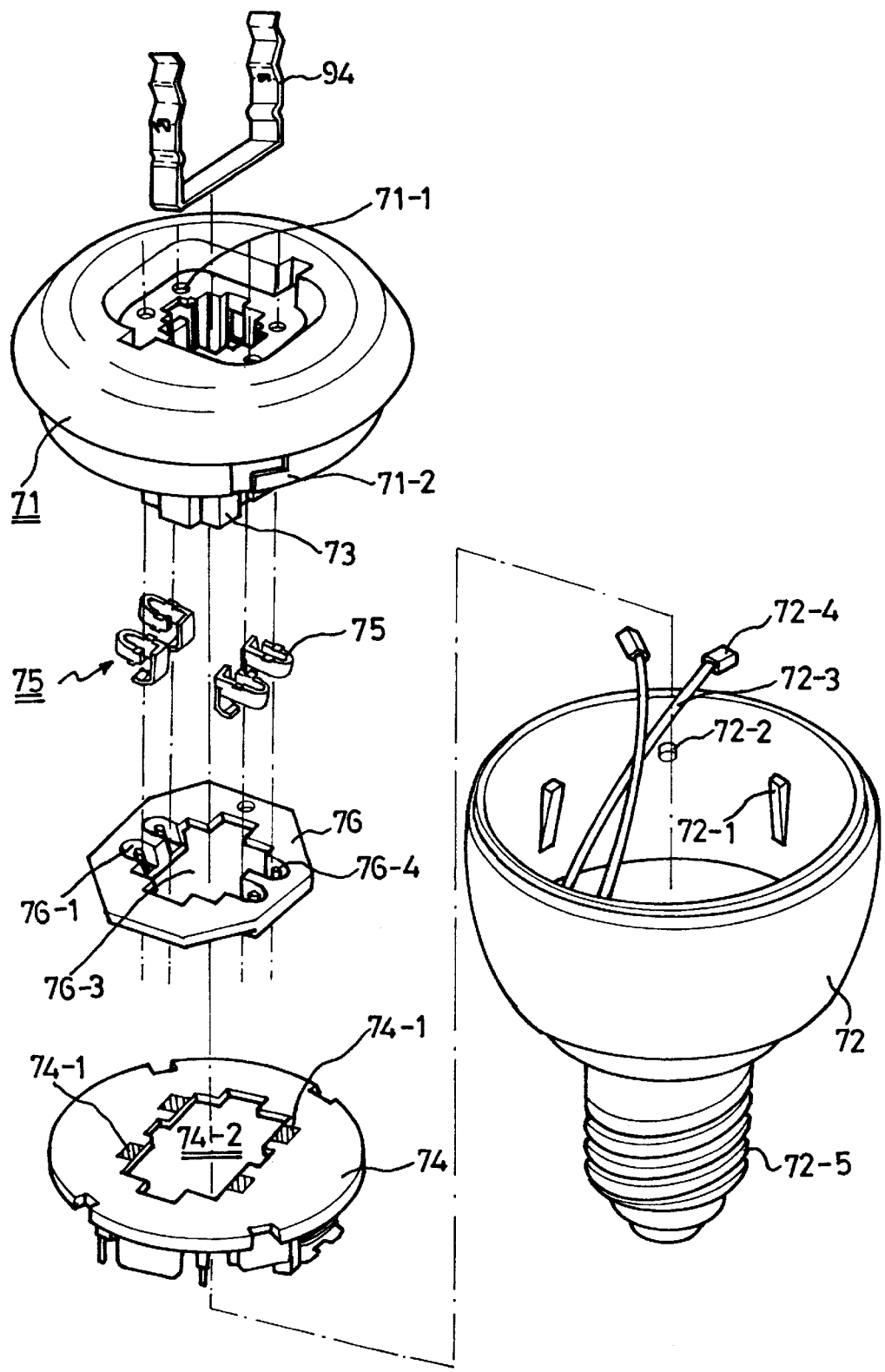
Figure 5B:
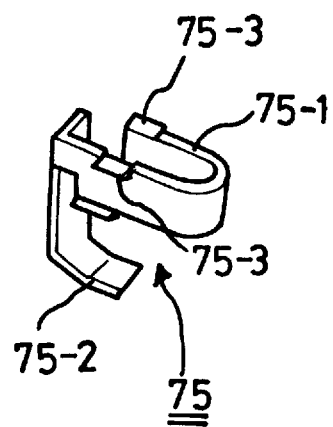
Figure 5C:
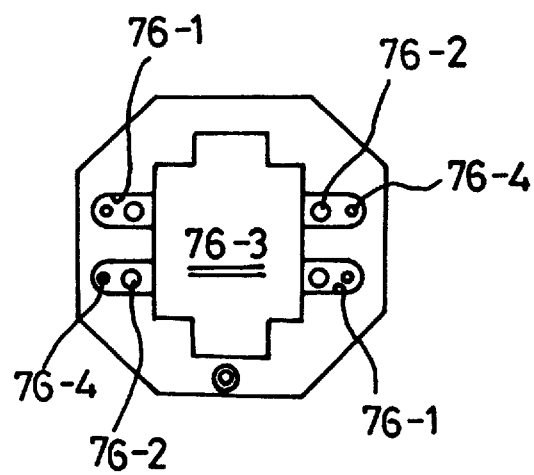

Referring to FIG. 3, 4, and 5, a compact fluorescent lamp adapter according to the present invention is explained.

The adapter for compact fluorescent lamp according to the present invention has a case, a PCB, a compact fluorescent lamp socket.

The case has a lower plate 71 (which also serves as a substrate of a socket) where a compact fluorescent lamp socket is settled and a upper plate 72 where an incandescent lamp base 72-5 is formed at one end. At the lower and upper plates, a coupling projection 72-2 is formed at upper plate 72, a coupling groove 71-2 is formed in lower plate 71. The upper plate 72 and lower plate 71 are mutually coupled to each other by these coupling projection and groove.

The PCB 74 is formed with a through hole 74-2 for allowing the plug retaining portion 73 to pass therethrough and has fluorescent ballast circuit elements. On the PCB contact pads 74-1 are formed at a predetermined portion to be contacted to a terminal 75.

Figure 1:
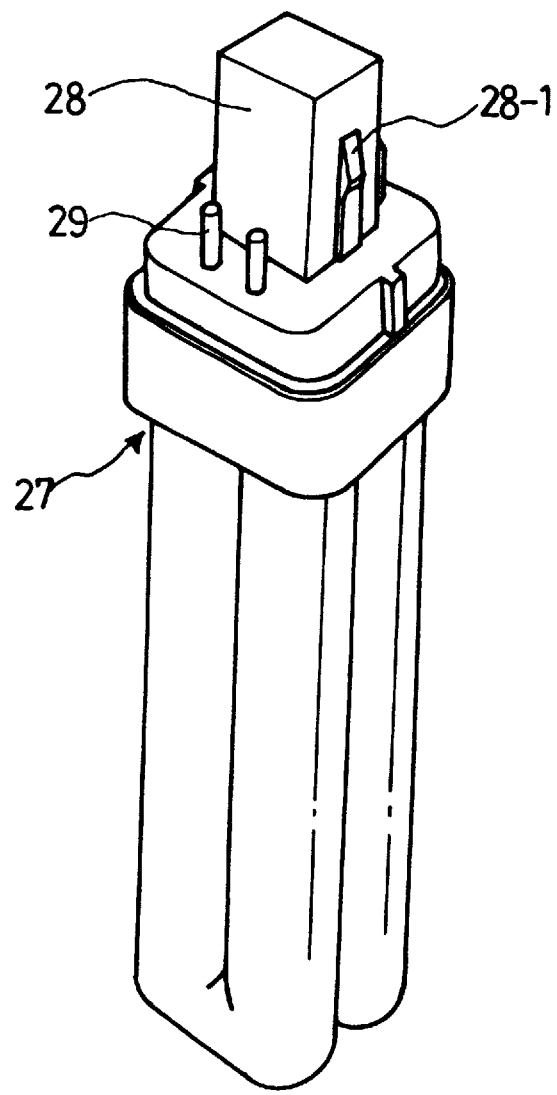
FIG. 1 is a perspective view showing a conventional compact fluorescent lamp.
Figure 2:
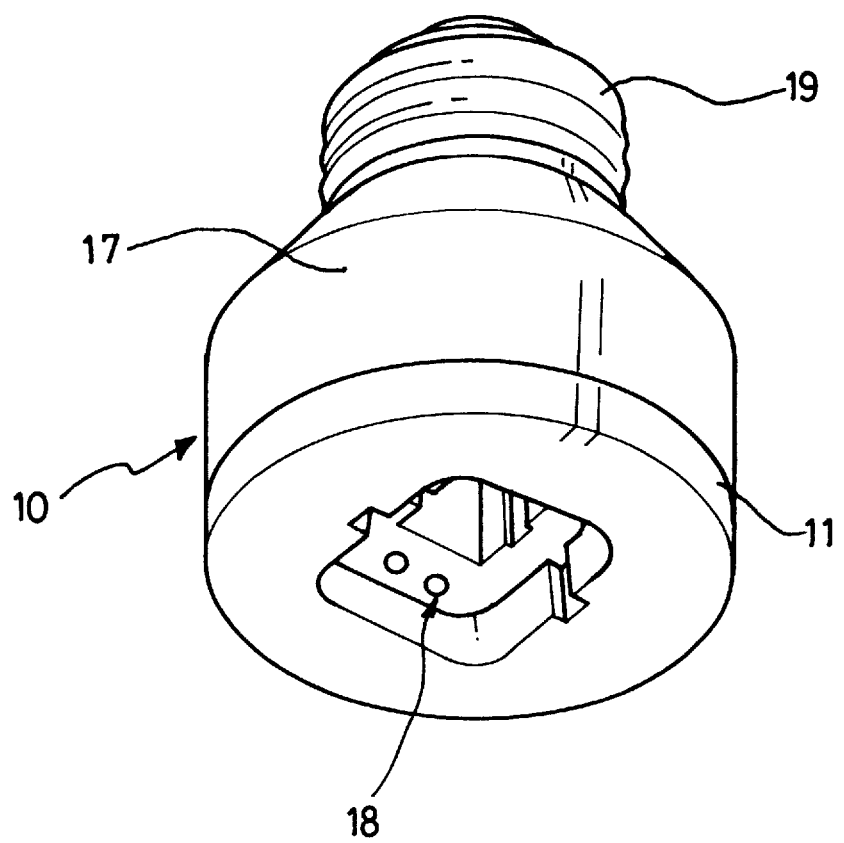
FIG. 2 is a perspective view showing an assembled ballast device for compact fluorescent lamp.

The compact fluorescent lamp socket has a plug retaining portion 73 formed on lower plate 71 for receiving the compact fluorescent lamp plug 28 (see FIG. 1).

The compact fluorescent lamp socket is constituted with a substrate, terminal settling plate and terminals.

The socket substrate 71 has through holes 71-1 for fluorescent lamp plug pins 29 to be inserted therethrough, a plug retaining portion 73 for accepting a compact fluorescent lamp plug 28.

The terminal 75 has an elastic contact portion 75-2 to be contacted with a contact pad 74-1 of PCB 74, a ring contact portion 75-1 to be contacted with a plug pin of the compact fluorescent lamp. The elastic contact portion 75-2 which is a tail of terminal 75 secures an electrical connection by contacting with the contact pad 74-1 formed at a predetermined portion of PCB 74. An exact portion of the ring contact portion 75-1 is a little wide open in order for the pin to easily inserted, by punching during a forming process.

The Terminal settling plate 76 is formed with a terminal retaining groove 76-1 into the lower portion thereof, and a first through hole 76-2 for allowing plug pins 29 to penetrate therethrough is formed over terminal retaining groove 76-1. A second through hole 76-3 is formed at center area of the terminal settling plate 76 for allowing the plug retain portion 73 passing through. This second through hole 76-3 may be formed asymmetrically in order to avoid a misassembling with the plug retain portion. In the terminal retaining groove 76-1, a pin 76-4 is formed to hold a ring contact portion 75-1 of the terminal when assembling the terminal and the terminal settling plate to the socket substrate. The terminal settling plate 76 covers to fix a portion other than elastic contact portions 75-2 of terminals 75. The elastic contact portion 75-2 which is the tail of terminal 75 secures an electrical connection by contacting with electric contact pad 74-1 formed to a predetermined portion of PCB 74.

An elastic hooking jaw 73-1 formed by partially cutting off the side wall of the plug retaining portion 73 is formed to both side walls thereof. The terminal settling plate 76 is limited by elastic hooking jaw 73-1, so upper movement thereof inhibited if descending beyond a prescribed distance when terminal settling plate 76 moved downward from an upper end 73-2 of plug retaining portion 73. Thus, terminal 75 is fixed to internal of terminal retaining groove 76-1.

PCB 74 is constructed with circuit elements onto one side thereof and electric contact pad 74-1 onto the opposite side thereof in contact with circuit wiring and an elastic contact portion 75-2 of terminal 75 for connecting plug pin 29 and the electronic circuit.

A pressing projection 72-1 for pressing PCB 74 is formed at an inside of the upper plate 72 of the adapter case. Thus, when the upper plate is coupled to the lower plate, PCB 74 is pressed by a prescribed distance to permit the contact pad 74-1 of PCB 74 to be closely attached to elastic contact portion 75-2 of terminal 75. At this time, the through hole 74-2 receives the plug retaining portion 73.

A position setting portion for installing a circuit element 77 (e.g., transformer) could be formed to the upper portion of plug retaining portion 73. The relatively bulky element normally placed onto this location can be disposed to the inside of the incandescent lamp base portion.

A locking spring 94 for holding a lock projection 28-1 of socket plug 28 of the compact fluorescent lamp is installed to the interior of socket plug retaining portion 73.

A vertical groove 73-2 may be formed in the side of plug retaining portion 73 to which elastic contact portion 75-2 of terminal 75 is to be guided for contriving more secure operation. Posts formed to the side of the plug retaining portion or the shape of the retaining portion are asymmetrically formed to be inserted into just a preset direction when the PCB is joined with the terminal settling plate.

PCB 74 is formed with a retaining groove 76-2 for receiving plug retaining portion 73 into which retaining portion 73 of compact fluorescent lamp socket plug 28 is inserted, and grooves for giving a coupling projection 72-2 a passage are formed at circumference of PCB 74.

The adapter is assembled as below.

First, terminals 75 being the conductive body are inserted to terminal retaining grooves 76-1 of terminal settling plate 76, and plug retaining portion 73 is inserted to retaining groove 76-2 for receiving plug retaining portion 73 of terminal settling plate 76 to be closely attached to socket substrate 71 until it locked by elastic hooking jaw 73-1.

Thereafter, PCB 74 assembled with the adapter circuit elements is fitted around plug retaining portion 73, and the connector 72-4 for connecting the two lines 72-3 of the incandescent lamp base and pins 74-4 installed for power supply lines of PCB 74 are connected.

Successively, upper plate 72 and lower plate 71 are joined with each other via the conventional method. In this embodiment illustrated, after coupling projection 72-2 formed to upper plate 72 is closely attached to be inserted into coupling groove 71-2 formed in lower plate 71, upper plate 72 and lower plate 71 are mutually rotated to be completely coupled to each other, thereby preventing any disjoint. Once upper plate 72 and lower plate 71 are coupled to each other, pressing projection 72-1 formed to upper plate 72 presses PCB 74 to electrically connect the contact pads 74-1 of PCB 74 to elastic contact portions 75-2 of terminal 75.

Consequently, the soldering is not required for assembling the socket and the case of the adapter, and the assembly work need no driver, so that assembly efficiency is improved.

In the adapter structure according to the present invention, the size of the adapter case for fluorescent lamp is significantly reduced while maintaining the size of the incandescent lamp base and compact fluorescent lamp socket to be compatible with the existing products. Therefore, the adapter according to the present invention is highly practical and can be continuously used by replacing the compact fluorescent lamp upon the expiration thereof.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A compact fluorescent lamp adapter having fluorescent lamp ballast circuit for coupling a compact fluorescent lamp to a commercial incandescent lamp socket, the adapter comprising:

a case having a lower plate where a compact fluorescent lamp socket is formed and an upper plate where an incandescent lamp base is formed, a PCB in said case and having a plug through hole accommodating a plug retaining portion of the compact fluorescent lamp socket, and having a fluorescent lamp ballast circuit connected to the incandescent lamp base and the compact fluorescent lamp socket, said compact fluorescent lamp socket has at least two terminals having ring contact portions contacted by fluorescent lamp plug pins and elastic contact portions contacted with contact pads formed on the PCB; and a terminal settling plate settling said ring contact portions of the terminals onto pin through holes respectively formed in said lower plate;

elastic hooking jaws formed at both side walls of the plug retaining portion locking said terminal settling plate with said terminal settling plate located downward a prescribed distance from the upper end of said plug retaining portion; and a plurality of pressing projections formed at an inner side of said upper plate for pressing contact pads formed on said PCB to the elastic contact portions of the terminals when said upper plate is coupled with said lower plate.

2. The compact fluorescent lamp adapter as claimed in claim 1, wherein a vertical groove is formed at sides of said plug retaining portion where said elastic contact portion of said terminal is guided therethrough.

3. A socket for compact fluorescent lamp comprising:

a socket substrate having pin through holes for fluorescent lamp plug pins to be inserted and having a plug retaining portion for receiving a compact fluorescent lamp plug;

at least two terminals having a ring contact portion for accepting the fluorescent lamp plug pin and an electric contact portion contacting with contact pads formed on a PCB;

a terminal settling plate mounting the terminals onto said pin through holes formed in said socket substrate, said plate also having terminal retain grooves; and the plug retaining portion having elastic hooking jaws at both sides of the plug retaining portion watch latch of said terminal settling plate with said socket substrate.

4. The socket for compact fluorescent lamp as claimed in claim 3, wherein linear grooves are formed at sides of the plug retaining portion for guiding the terminals when assembling the terminal and the terminal settling plate to the socket substrate.

5. The socket for compact fluorescent lamp as claimed in claim 4, wherein pin is formed in the terminal retain groove for holding a ring contact portion of the terminal when assembling the terminal and the terminal settling plate to the socket substrate.

* * * * *